(12) United States Patent
Schaller et al.

(10) Patent No.: US 12,313,167 B2
(45) Date of Patent: May 27, 2025

(54) VALVE STOP FOR USE WITH A FLUID END ASSEMBLY

(71) Applicant: BEST FLOW LINE EQUIPMENT, L.P., Fort Worth, TX (US)

(72) Inventors: Katherine Goodnight Schaller, Fort Worth, TX (US); Tyrone Walker, Fort Worth, TX (US); Christopher Kowalski, Fort Worth, TX (US); Jeffrey Plaisted, Fort Worth, TX (US); Jonathan M. Brinson, Fort Worth, TX (US)

(73) Assignee: BEST PUMP AND FLOW, LLC, Willow Park, TX (US)

( * ) Notice: Subject to any disclaimer, the term of this patent is extended or adjusted under 35 U.S.C. 154(b) by 49 days.

(21) Appl. No.: 18/343,828

(22) Filed: Jun. 29, 2023

(65) Prior Publication Data

US 2025/0003503 A1  Jan. 2, 2025

(51) Int. Cl.
 | | |
 |---|---|
 | *F16K 1/52* | (2006.01) |
 | *F04B 15/02* | (2006.01) |
 | *F04B 47/00* | (2006.01) |
 | *F04B 53/10* | (2006.01) |
 | *F16K 15/06* | (2006.01) |

(52) U.S. Cl.
CPC .............. *F16K 1/523* (2013.01); *F04B 15/02* (2013.01); *F04B 47/00* (2013.01); *F04B 53/1027* (2013.01); *F16K 15/063* (2013.01); *F04B 53/10* (2013.01); *F04B 53/1025* (2013.01)

(58) Field of Classification Search
CPC ........ F16K 1/523; F16K 15/063; F04B 47/00; F04B 15/02; F04B 53/1027; F04B 53/10; F04B 53/1025
See application file for complete search history.

(56) References Cited

U.S. PATENT DOCUMENTS

| | | | |
|---|---|---|---|
| 8,820,703 | B2 | 9/2014 | Johnson |
| 9,732,746 | B2 * | 8/2017 | Chandrasekaran ... F16K 15/026 |
| 9,784,262 | B2 | 10/2017 | Bayyouk |
| 9,791,082 | B2 | 10/2017 | Baxter |
| 10,527,036 | B2 | 1/2020 | Blume |
| 10,767,773 | B2 * | 9/2020 | Lee .......................... B60T 17/04 |
| 11,078,903 | B2 | 8/2021 | Nowell |
| 11,085,544 | B2 | 8/2021 | Yeung |
| 11,111,915 | B2 | 9/2021 | Bayyouk |
| 11,231,118 | B1 * | 1/2022 | Kubricky .............. F16K 15/063 |
| 11,346,339 | B2 | 5/2022 | Nowell |
| 11,434,900 | B1 * | 9/2022 | Alex ......................... F16K 1/42 |
| 2004/0000342 | A1 * | 1/2004 | Takahashi ............. F16K 15/025 |
| | | | 137/538 |

(Continued)

*Primary Examiner* — Jessica Cahill
(74) *Attorney, Agent, or Firm* — Abel Schillinger, LLP (57) ABSTRACT

A fluid end assembly has a body with at least one bore therein in which the bore has a retaining shoulder extending inwardly therefrom, a valve slidably movable in the bore, a spring having one end affixed to a surface of the valve and positioned in the inner diameter of the bore, and a valve stop having a surface bearing against the retaining shoulder. The spring as an opposite end affixed to a surface of the valve stop. The valve stop has a central portion with a plurality of wings radiating outwardly therefrom. An outer surface is formed at the outer periphery of the plurality of wings so as to receive the retaining shoulder therein.

16 Claims, 7 Drawing Sheets

(56) References Cited

U.S. PATENT DOCUMENTS

| | | | | |
|---|---|---|---|---|
| 2014/0286805 A1* | 9/2014 | Dyer | ............... | F04B 39/12 |
| | | | | 417/570 |
| 2018/0363642 A1* | 12/2018 | Salih | ............... | F04B 53/1027 |
| 2019/0011051 A1* | 1/2019 | Yeung | ............... | F04B 53/10 |
| 2019/0101109 A1* | 4/2019 | Cortes | ............... | F16K 15/026 |
| 2019/0120389 A1* | 4/2019 | Foster | ............... | F16K 1/443 |
| 2021/0148349 A1* | 5/2021 | Nowell | ............... | F04B 15/02 |

\* cited by examiner

VALVE STOP FOR USE WITH A FLUID END ASSEMBLY

CROSS-REFERENCE TO RELATED APPLICATIONS

Not applicable.

BACKGROUND OF THE INVENTION

1. Field of the Invention

The present invention relates to fluid end assemblies. More particularly, the present invention relates to valve stops that are used in a bore of a fluid end assembly.

2. Description of Related Art Including Information Disclosed Under 37 CFR 1.97 and 37 CFR 1.98

Hydraulic fracturing is the injection, under pressure, of water, sand, and/or other fluids within a well formation to induce fractures in a rock layer. Oil and gas drilling operators commonly use hydraulic fracturing (or "fracking") to release petroleum and natural gas as well as other substances from the rock layer. The high pressure injection creates new channels in the rock which can increase the extraction rates and ultimate recovery of fossil fuels. A hydraulic fracturing pump or "frac pump" is used to pump water, sand, gravel, acids, proprietary liquids and concrete into the well formation. The solids pumped down the hole into the fractures keep the fractures from closing after the pressure is released. Operators generally attempt to pump as much volume as possible at or above the pressure necessary to fracture the well.

Fracturing gas or oil wells is very expensive and generally charged by the hour. Because the formation may be located thousands of feet below the earth's surface, the pressures generated and required by fracturing pumps are substantial, sometimes exceeding 20,000 pounds per square inch (p.s.i.). At peak times, a given fracturing pump may operate for more than eight consecutive hours (with drive engines running) at as much as 2800 revolutions per minute (rpm). With gear changes, the pump generally runs between a low of 60 rpm to a high of as much as 300 rpm.

A fracturing pump comprises two major components: a power frame and a fluid end. The power frame and fluid end are held together by a group of stay rods. The power frame is driven by high horsepower diesel engines, electric motors, or turbine engines. Internally, a fracturing pump increases pressure within a fluid cylinder by reciprocating a plunger longitudinally within the fluid end cylinder. Conventional high pressure, high volume fracturing pumps have either three or five cylinders. Other designs may have more or fewer cylinder counts.

The fluid ends of hydraulic or well stimulation pumps must produce enormous pressure and move a large volume of abrasive fluid that is high in solids content. Fracturing pumps were originally designed for intermittent service of six to eight hours per day. Today's pumps operate many more hours per day, and require much more maintenance than ever before.

A conventional fluid end comprises a block of steel comprising a plunger opening and compression area, intake and pressure valves with an intake path for supply of media to the plunger area and an exit path, internally connected to the compression chamber, for the pressurized fluid transfer. The vast majority of conventional fracturing pump fluid ends are "mono blocks". A mono block is machined from a single piece of material weighing approximately 4500-8000 lbs. Recently, segmented fluid ends have been introduced in which the block is divided into a number of pieces corresponding to the number of cylinders. For example, a three cylinder fluid end ("triplex") in such a conventional segmented fluid end comprises three segments and a five cylinder fluid end ("quint") comprises five segments. Each segment of such segmented fluid ends comprises a single block of material. The design and maintenance of the conventional one piece segmented fluid end is virtually no different than the design or maintenance of the conventional mono block.

Figure 1:
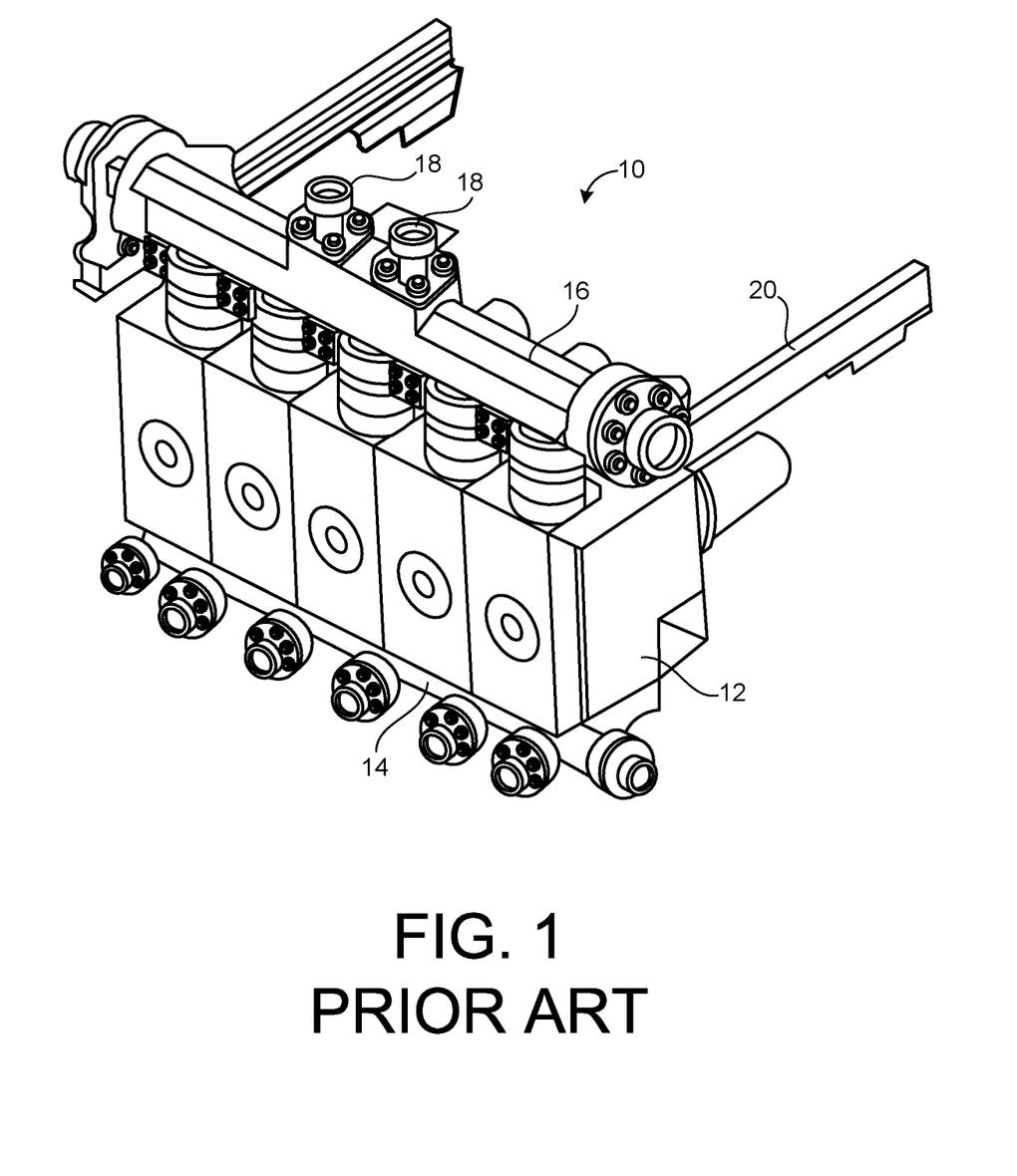
FIG. 1 is an upper perspective view of a prior art fluid end assembly.

FIG. 1 shows a prior art fluid end assembly 10. This fluid end assembly 10 includes a plurality of individual fluid end segments 12 that are joined in side-by-side relationship. A suction manifold 14 is located at the bottom of the individual fluid end segments 12. A discharge manifold 16 is in fluid communication with a fluid end segment 12 that extends across a top of the fluid end segment 12. Pressure transducer/relief valve ports 18 are cooperative with the common discharge manifold 16. A service rail 20 is configured so as to support the fluid end assembly at an exterior surface thereof. The intake manifold 14 of the discharge manifold 16 goes into and out of each of the segments 12. The user will hook flowlines to each end of the manifolds 14 and 16. In normal use, pistons and cylinders within the fluid end assembly 10 serve to pressurize the fluid passing therethrough.

Figure 2:
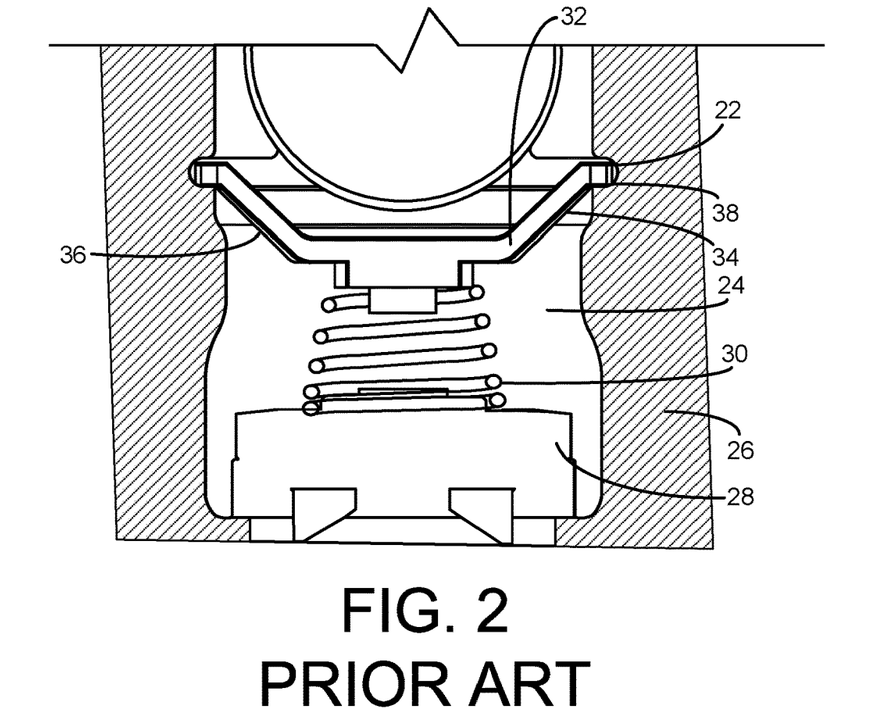
FIG. 2 is a cross-sectional view showing a valve stop of the prior art as used within a bore of the fluid end assembly.

FIG. 2 shows a valve stop 22 that is used in the bore 24 of a fluid end assembly 26 of the prior art. Valve stop 22 is typical of valve stops commercially used on fluid end assemblies of the prior art, such as those shown in FIG. 1. A valve 28 is positioned in the bore 24 and is slidably movable in the bore 24 against the resistance of a spring 30. Spring 30 has one end bearing against a surface of the valve 28 and an opposite end bearing against a central portion 32 of the valve stop 22. The valve stop 22 has wings 34 and 36 that radiate outwardly from the central portion 32. The wings 34 and 36 are circumferentially spaced from each other and diametrically opposite each other. The ends of the wings 34 and 36 of the valve stop 22 are received in a groove 38 formed in the wall of the bore 24. In this manner, the valve stop 22 is retained in a proper position during the movement of the valve 28 and provides resistance against the spring 30.

Figure 3:
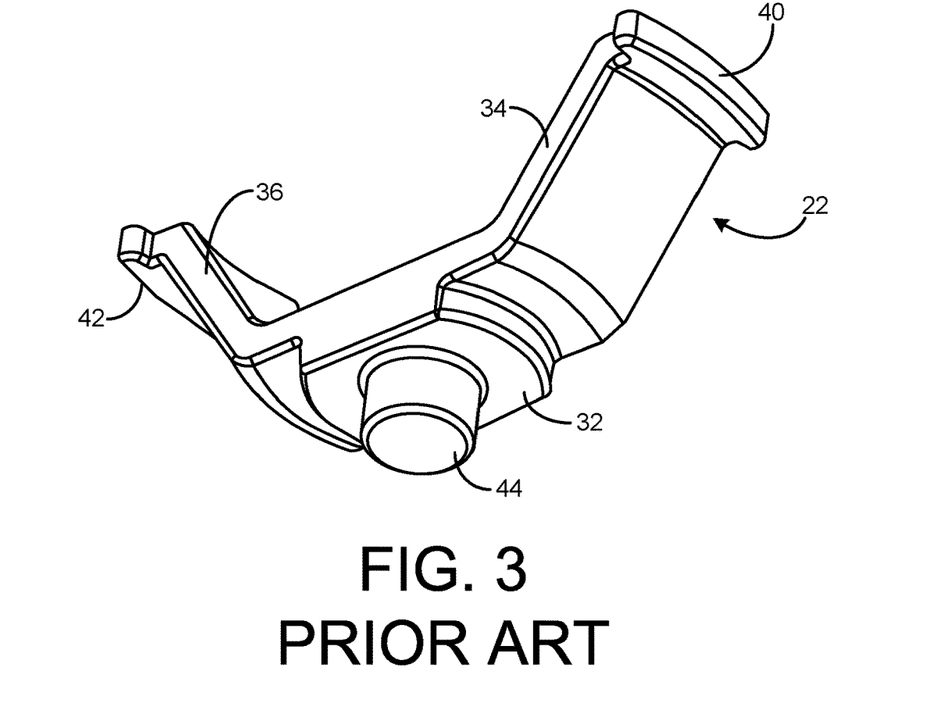
FIG. 3 is a bottom perspective view of the valve stop of the valve stop of the prior art.

FIG. 3 is an isolated view of the valve stop 22 of the prior art of FIG. 2. It can be seen that the valve stop 22 has a central portion 32 with wings 34 and 36 radiating outwardly therefrom. Wings 34 and 36 extend at an obtuse angle outwardly from the central portion 32. Wing 34 has a peripheral surface 40 that will be received within the groove 38 in the bore of the fluid end. Similarly, wing 36 will have a peripheral surface 42 that is received in the groove 38 of the bore 24. A post 44 extends downwardly from the central portion 32. Post 44 is adapted to receive an end of the spring 30.

The valve stop 22 of the prior art (as shown in FIGS. 2 and 3) has a variety of problems. First, the connection between the peripheral surfaces 40 and 42 and the groove 38 creates stress risers in the sharp areas of contact between the wall of the bore 28 and the surfaces of the wings 34 and 36. These stress risers can often damage or erode the valve stop 22 over time. Since the valve stop 22 is exposed to the extremely corrosive elements being passed by the fluid end assembly, the stress risers can cause the valve stop 22 to be replaced frequently over time. Any replacement of the valve stop 22 takes a great deal of time and effort. The fluid end assembly will be down during the time in which such a valve stop needs to be replaced. Furthermore, the deterioration of the valve stop 22 will reduce the performance of the valve 28 within the fluid end assembly. Often, specialized tools are required so as to install the valve stop 22 in its position within the groove 38. Since valve stop 22 only uses a pair of wings that radiate outwardly from the central portion 32, the forces of the fluid passing by the valve stop 22 will create a large amount of the force of the fluid against the wings 34 and 36 and generally against the valve stop 22. This can also deteriorate the performance and life of the valve stop 22 over time.

In the past, various patents and patent applications have published with respect to such valve structures and valve stops in association with fluid end assembly. For example, U.S. Pat. No. 8,820,703, issued on Sep. 2, 2014 to Johnson et al., describes a double-action directional fluid flow valve for a fluid end assembly. This double-action directional fluid flow valve includes a stepped piston connected with a poppet valve and movable by a controller between open and closed positions by applying a continuous pressure to a small diameter piston face and selectively applying and removing pressure from a large diameter piston face in order to move the poppet valve between an open position at a closed position.

U.S. Pat. No. 9,784,262, issued on Oct. 10, 2017 to Bayyouk et al., shows a fluid end for a multiple reciprocating pump assembly that includes at least three plunger bores each receiving a reciprocating plunger. Each plunger bore has a plunger bore axis. The fluid end includes suction valve bores. Each suction valve bore receives a suction valve and has a suction valve bore axis. The fluid end further includes discharge valve bores. Each discharge valve bore receives a discharge valve and has a discharge valve bore axis. The axes of at least one of the suction and discharge valve bores is inwardly offset in the fluid end from its respective plunger bore axis.

U.S. Pat. No. 9,791,082, issued Oct. 17, 2017 to Baxter, describes a modular fluid end for a multiplex plunger pump. Each module is machined from a single-piece forging with a plunger bore intersected by a linear section/discharge bore. Pump fluid is discharged straight out of a top of the module into a discharge manifold. A compression clamp applies a crush load to oppose sides of the modules.

U.S. Pat. No. 10,527,036, issued on Jan. 7, 2020 to G. H. Blume, provides a plunger pump fluid end housing assembly that has a fluid end housing, multiple plungers, a single in-line suction valve and seat corresponding with each plunger. A discharge valve and seat correspond with each plunger. An axis of the suction valve and seat are parallel with the plunger. The suction manifold is positioned to feed the fluid chamber opposite the power end of the fluid end. The plunger chamber of the fluid end housing is square or rectangular in cross-section with large fillets at corners and flats between the fillets.

U.S. Pat. No. 11,078,903, issued on Aug. 3, 2021 to Nowell et al., provides a valve seat used in the fluid end of a fracturing pump. The external surface of the valve seat has a tapered portion that retains the valve seat in the fluid end. The external surface also has a portion that is substantially cylindrical. A hardened insert is integrated into a strike face of the valve seat. The tapered portion is at a first end of the valve seat and the tapered end is at a second end of the valve seat. The second end of the valve seat is formed such that its exterior surface does not contact the fluid end.

U.S. Pat. No. 11,085,544, issued on Aug. 10, 2021 to T. Yeung, describes a valve body for a fracturing pump. The valve body has a head and a compressible seal. The head provides a valve surface adapted to engage the valve seat. The compressible seal is carried on the head radially inward of the valve surface and is adapted to engage the valve seat. The compressible seal is mounted between the head and a valve guide having a plurality of legs. The face of the compressible seal has a slightly curved, convex sealing surface.

U.S. Pat. No. 11,111,915, issued on Sep. 7, 2021 to Bayyouk et al., provides a valve for a reciprocating pump assembly that includes a valve body and a seal. The valve body defines a first frustoconical surface and an outside annular cavity. The seal extends within the outside annular cavity and includes a first tapered and circumferentially-extending surface adapted to sealingly engage the tapered surface of the valve seat. The seal includes an annular bulbous protrusion from which the first tapered and circumferentially-extending surface angularly extends. The first tapered and circumferentially-extending surface extends between the annular bulbous protrusion and the first frustoconical surface of the valve body.

U.S. Pat. No. 11,346,339, issued on May 31, 2022 to Nowell et al., teaches a high-pressure pump having a fluid end mechanically coupled to a power end. The power end is modular and comprises a crankshaft section, a crosshead section, and a connector section coupled together by a first set of stay rods. The fluid end comprises a plurality of fluid end sections positioned in side-by-side relationship. Each of the plurality of fluid end sections are attached to the power end using a plurality of a second set of stay rods.

U.S. Patent Application No. 2019/0120389, published on Apr. 25, 2019 to Foster et al., describes a valve for use in a fluid end. The valve has a solid body with a sealing surface. The valve is movable into a position wherein the valve contacts a valve seat. When in contact, the sealing surfaces prevent flow of fluid through the valve. The sealing surface has three regions. The outer region has an elastomeric seal insert disposed on the surface. The inner region has a shock-absorbing insert disposed on the surface. A metallic surface for metal-to-metal sealing with the valve seat is intermediate these inserts.

It is an object of the present invention to provide a valve stop for use with a fluid end assembly that prevents cracks in the bore.

It is another object of the present invention to provide a valve stop for use with a fluid end assembly that removes stress risers.

It is another object of the present invention to provide a valve stop for use with a fluid end assembly that prolongs the life of the fluid end.

It is another object of the present invention to provide a valve stop for use with a fluid end assembly that positively locks the valve stop in position.

It is another object of the present invention to provide a valve stop for use with a fluid end assembly that is installable by hand.

It is still another object of the present invention to provide a valve stop for use with a fluid end assembly that provides a better distribution of the forces flowing through the bore of the fluid end against the valve stop.

These and other objects and advantages of the present invention will become apparent from a reading of the attached specification and appended claims.

BRIEF SUMMARY OF THE INVENTION

The present invention is a fluid end assembly that has a body with at least one bore therein, a valve slidably movable in the bore, a spring having one end abutting a surface of the valve, and a valve stop having a surface bearing against a retaining shoulder formed in the inner diameter of the bore. The retaining shoulder extends inwardly of the wall of the bore. The spring is positioned in the inner diameter of the bore. The spring has an opposite end abutting a surface of the valve stop.

The retaining shoulder of the bore has an indentation between a first portion and a second portion thereof. The valve stop has an outer periphery with a generally U-shaped channel. The retaining shoulder is received within the generally U-shaped channel of the outer periphery of the valve stop. A surface of the U-shaped channel is positioned in the indentation between the first portion and the second portion of the retaining shoulder.

The valve stop has a central portion with a plurality of wings radiating outwardly of the central portion. The plurality of wings of the valve stop, in the preferred embodiment the present invention, comprises three wings that are generally equally circumferentially spaced from each other. Each of the three wings has an outer periphery. This outer periphery is engaged with the retaining shoulder of the bore. The retaining shoulder of the bore extends nearly entirely around the inner diameter of the bore. A surface of the U-shaped channel is positionable in the indentation between the first portion and the second portion of the retaining shoulder. The retaining shoulder has an opening formed therein. The opening of the retaining shoulder preferably has a width greater than a width of at least one of the three wings. An opposite end of the spring is abuts the central portion of the valve stop.

The present invention is also a valve stop for use in a bore of a fluid end assembly. The valve stop comprises a central portion having a plurality of wings radiating outwardly of the central portion and an outer surface formed at an outer periphery of each of the plurality of wings. The plurality of wings are circumferentially spaced from each other. The outer surface is adapted to receive a retaining shoulder that extends inwardly of a wall of the bore of the fluid end assembly.

In the preferred embodiment, the plurality of wings comprise three wings equally circumferentially spaced from each other. The outer surface has a generally U-shaped channel formed at an outer periphery thereof. This U-shaped channel is adapted to receive the retaining shoulder of the bore therein. The central portion of the valve stop has a spring-receiving surface thereon. The spring-receiving surface is adapted to receive one end of a spring thereon.

The present invention is also a fluid end assembly that comprises a bore having at least one bore therein and a retaining shoulder extending inwardly of an inner diameter of the bore, a valve slidably movable within the bore, a spring having one end abutting a surface of the valve in position in the inner diameter of the bore, and a valve stop having a plurality of wings radiating outwardly of a central portion thereof. The plurality of wings are circumferentially spaced from each other. Each of the plurality of wings has an outer surface bearing against the retaining shoulder of the bore in the body. In the preferred embodiment, the plurality of wings is three wings. Each of the three wings is equally circumferentially spaced from each other. The retaining shoulder of the bore has an indentation between a first portion and a second portion of the retaining shoulder. The outer surface of the plurality of wings has a generally U-shaped channel that receives the retaining shoulder. The interior of the generally U-shaped channel receives the first portion of the retaining shoulder. A surface of the U-shaped channel is positioned in the indentation between the first portion and the second portion of the retaining shoulder.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 4:
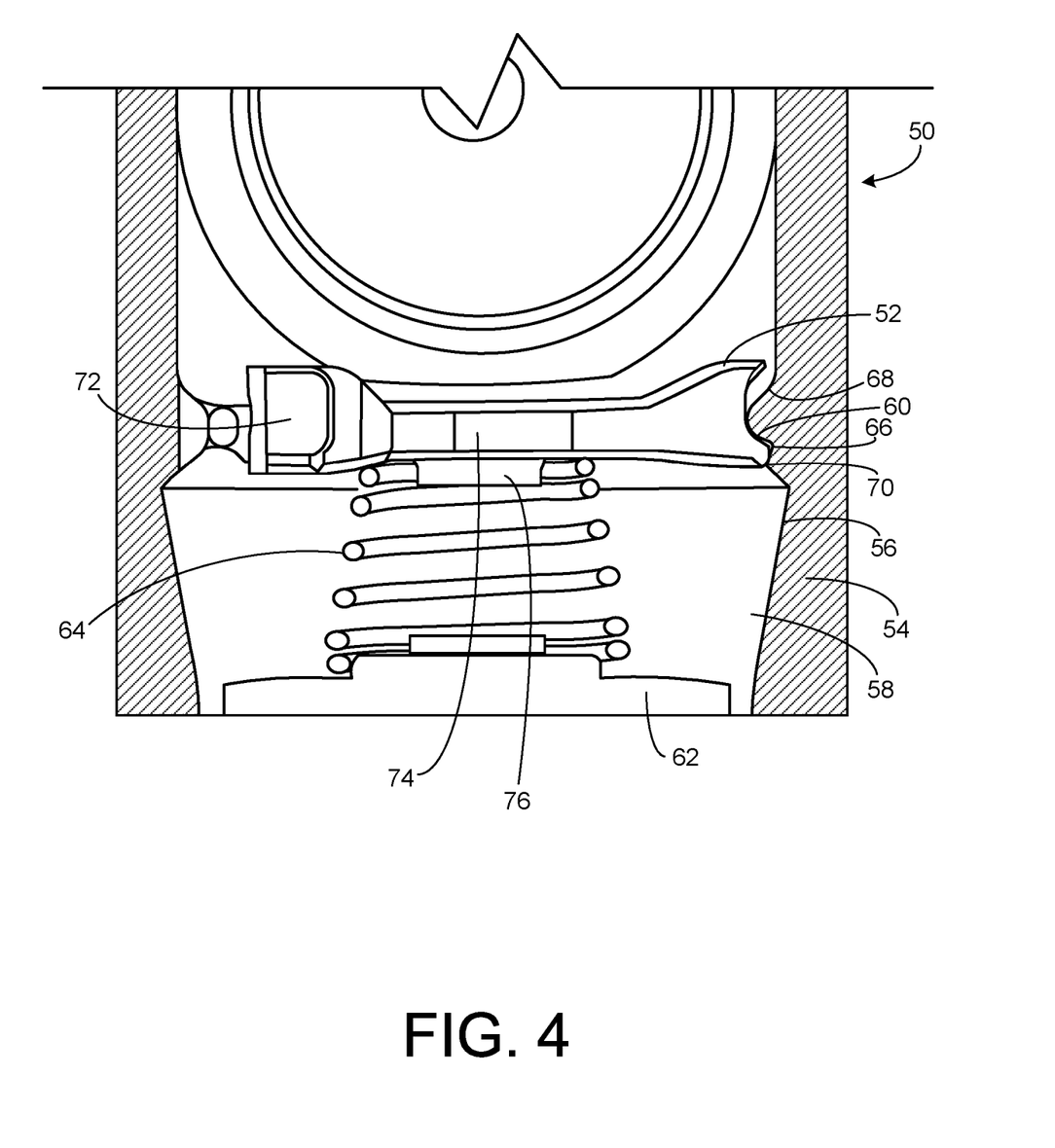
FIG. 4 is a cross-sectional view showing the valve stop of the present invention as located within a bore of a fluid end assembly.

FIG. 4 shows the fluid end assembly 50 using the valve stop 52 of the present invention. The fluid end assembly 50 has a body 54 having at least one bore 56 therein. The bore 56 has a wall 58 that defines an inner diameter of the bore 56. The wall 58 has a retaining shoulder 60 extending inwardly therefrom. A valve 62 is slidably movable within the bore 56. A spring 64 has one end affixed to or abutting a surface of the valve 62. The spring 64 is positioned within the inner diameter of the bore 56. The valve stop 52 has a surface that bears against the retaining shoulder 60. The spring 64 has an opposite end affixed to or abutting a surface of the valve stop 52.

The retaining shoulder 60 of the bore 56 has an indentation 66 formed between a first portion 68 and a second portion 70. The valve stop 52 has an outer periphery that has a generally U-shaped channel 72. The retaining shoulder 60 is received within this generally U-shaped channel 72 at the outer periphery of the valve stop 52. The retaining shoulder 60 will extend circumferentially around the inner diameter 58 of the bore 56.

As can be seen in FIG. 4, an interior of the generally U-shaped channel 72 receives the first portion 68 of the retaining shoulder 60 therein. A surface of the U-shaped channel 72 is positioned in the indentation 66 formed between the first portion 68 and the second portion 70 of the retaining shoulder 60.

Figure 5:
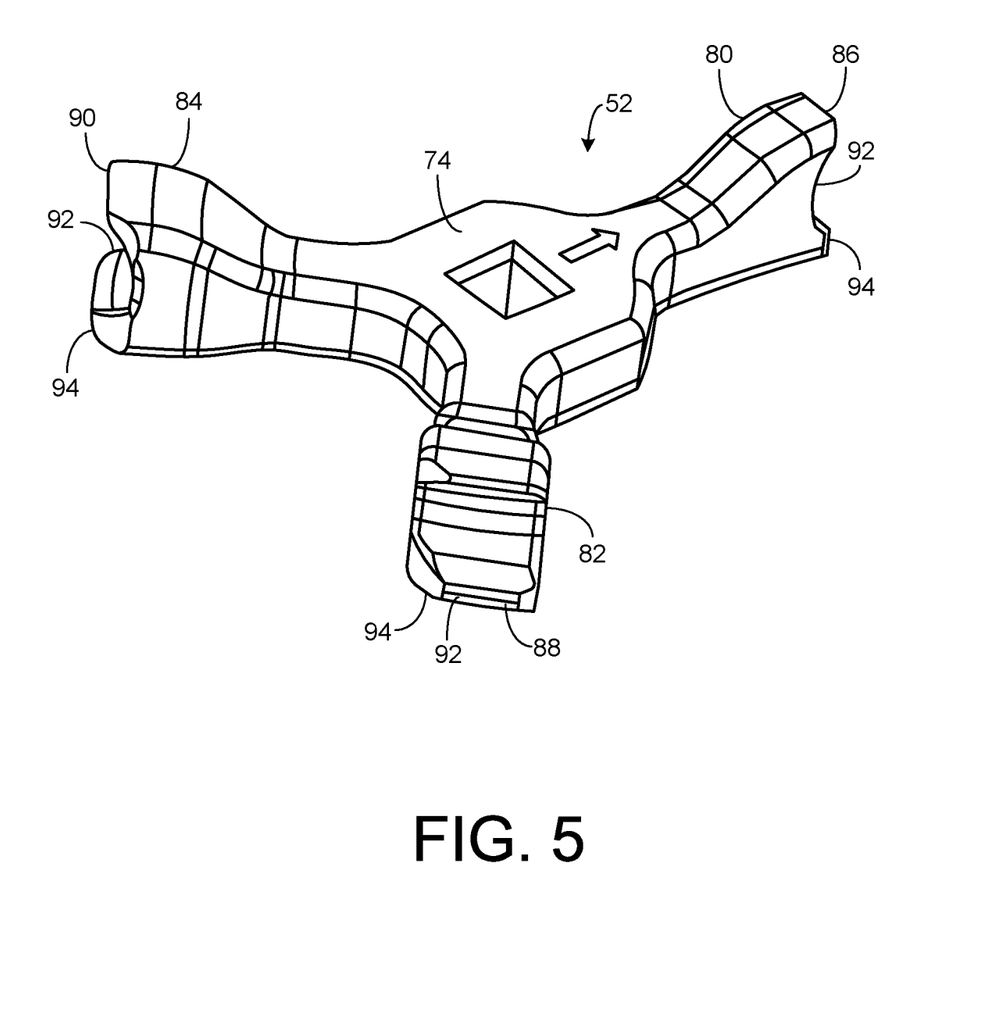
FIG. 5 is an isolated upper perspective view of the valve stop in accordance with the present invention.
Figure 6:
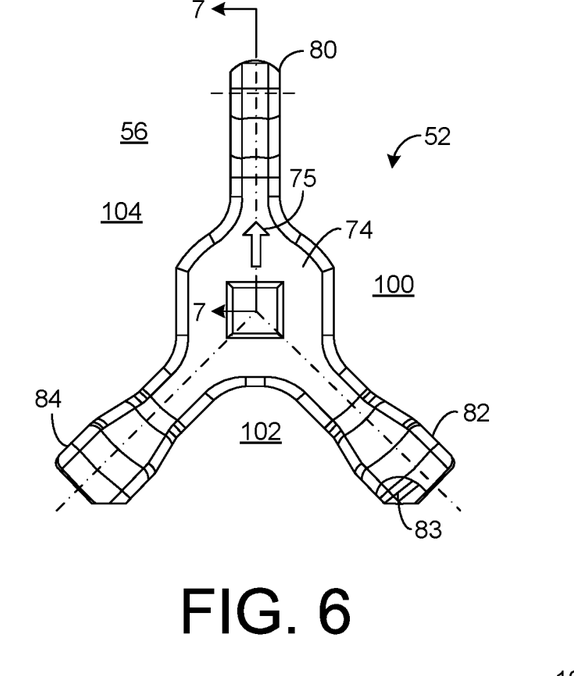
FIG. 6 is a top view of the valve stop of the present invention as positioned.

The valve stop 52 has a central portion 74 with a plurality of wings radiating outwardly of the central portion 74 (as better seen in FIGS. 5 and 6 herein). An opposite end of the spring 74 is affixed to or abuts a post 76 extending from the central portion 74 of the valve stop 52.

FIG. 5 shows the specific configuration of the valve stop 52 of the present invention. The valve stop 52 includes the central portion 74 having a plurality of wings 80, 82 and 84 radiating outwardly of the central portion 74. As can be seen in FIG. 5, the wings 80, 82 and 84 comprise three wings that are equally circumferentially spaced from each other. The wing 80 has an outer periphery 86. The wing 82 has an outer periphery 88. The wing 84 has an outer periphery 90. The outer peripheries 86, 88 and 90 are respectively engaged with the retaining shoulder 60 of the bore 56.

The outer peripheries 86, 88, and 90 of each of the wings 80, 82 and 84 has a generally U-shaped channel 92. These U-shaped channels 92 respectively receive the retaining shoulder therein. In particular, the first portion 68 of the retaining shoulder 60 is received in the generally U-shaped channel 92 of the valve stop 52. A surface 94 of each of the generally U-shaped channels 92 maintains wings 80, 82 and 84 over the retaining shoulder 60.

FIG. 6 illustrates a top view of the valve stop 52. The valve stop 52 has central portion 74 with wings 80, 82 and 84 radiating outwardly therefrom. The wings 80, 82 and 84 are equally circumferentially spaced from each other. As such, the space between the wings 80 and 82 defines a flow channel 100. The space between the wings 82 and 84 defines a flow channel 102. The space between the wings 84 and 80 defines a flow channel 104 within the bore 56. The flow channels 100, 102 and 104 define passageways whereby fluid within the bore 56 can pass by the valve stop 52. These large flow passageways 100, 102 and 104 permit better fluid flow by the wings 80, 82 and 84 than the pair of wings of the prior art. In particular, the large area provided by the flow passageways 102 and 104 allow the wings 80, 82 and 84 to be of a smaller cross-sectional area than the pair of wings of the prior art. The three-wing configuration of the present invention better distributes the forces of fluids passing through the bore 56 across surfaces of the valve stop 52. The central area 74 of the valve stop 52 provides an area against which the end of the spring can bear.

Figure 7:
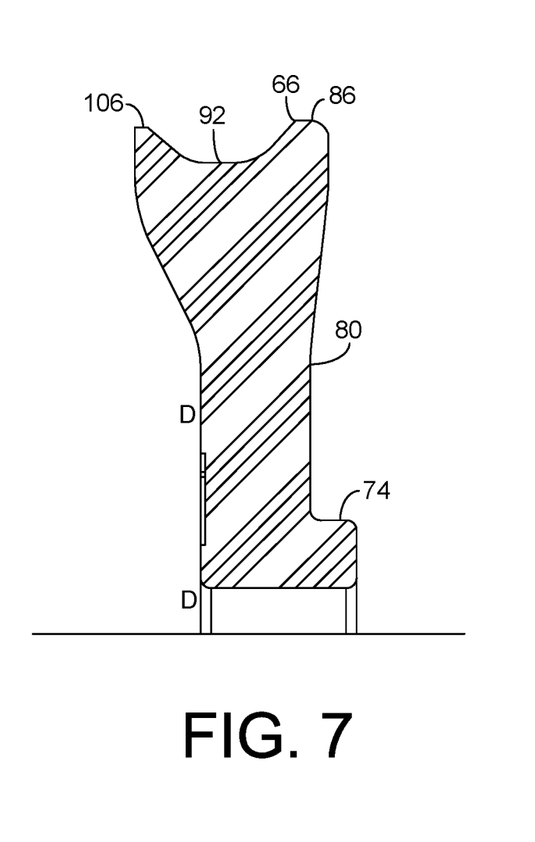
FIG. 7 is a cross-sectional view of a wing of the valve stop of the present invention.

FIG. 7 is a detailed view of the wing 80 of the valve stop of the present invention. Wing 80 extends from the central portion 74 to a periphery 86. Periphery 86 defines a generally U-shaped channel 92 therein. The generally U-shaped channel 92 will act to receive the first portion 68 of the retaining shoulder 60 therein. The portion 66 at the periphery 86 will be positioned and retained between the portions 68 and 70 of the retaining shoulder 60. The surface 106 is relatively narrow and will initially be positioned beyond the retaining shoulder 60. In particular, FIG. 7 shows that the various surfaces at the periphery 86 of the wing 80 are very smooth. As such, any contact between the surfaces and the retaining shoulder 60 will avoid the sharp risers of the prior art. Since the present invention relies upon a retaining shoulder 60 that extends into the inner diameter of the bore 56, the present invention avoids the weakening of the structure of the fluid end assembly by forming a groove in the wall of the bore. This provides an enhanced structural integrity to the bore of the fluid end assembly. The placement of the generally U-shaped channel 72 over the retaining shoulder serves to maintain the valve stop 52 in a proper position in generally snap-fit relationship. The smooth surfaces avoid any stress risers. As such, the life of the valve stop 52 will be extended. Fracturing of the valve stop 52 and/or of the walls of the bore of the fluid end assembly is avoided. The installation of the valve stop 52 can be carried out in a very simple and easy manner by hand. The use of the three wings improves flow characteristics of fluid within the bore of the fluid end assembly and distributes forces so as to further avoid any damage to the valve stop 52.

Referring back to FIG. 6, it can be seen how of the plurality of wings have different configurations. Specifically, the first wing 80 has a relatively narrow width compared to the other wings 82 and 84. This first wing 80 is aligned with the arrow 75, which is utilized to enable proper placement of the valve stop 52 within the fluid end assembly 50. The tip 106 of the first wing 80 is also geometrically unique compared to the wings 82 and 84. This tip 106 is sharper and narrower than the periphery of the remainder of the valve stop 52, and this tip 106 is provided for positioning within the indentation 66 of the retaining shoulder 60, which will be described herein below. FIG. 6 also illustrates how the wing 82 has a rounded, chamfered edge 83 which enables placement of the valve stop 52 at a particular angle.

Figure 8:
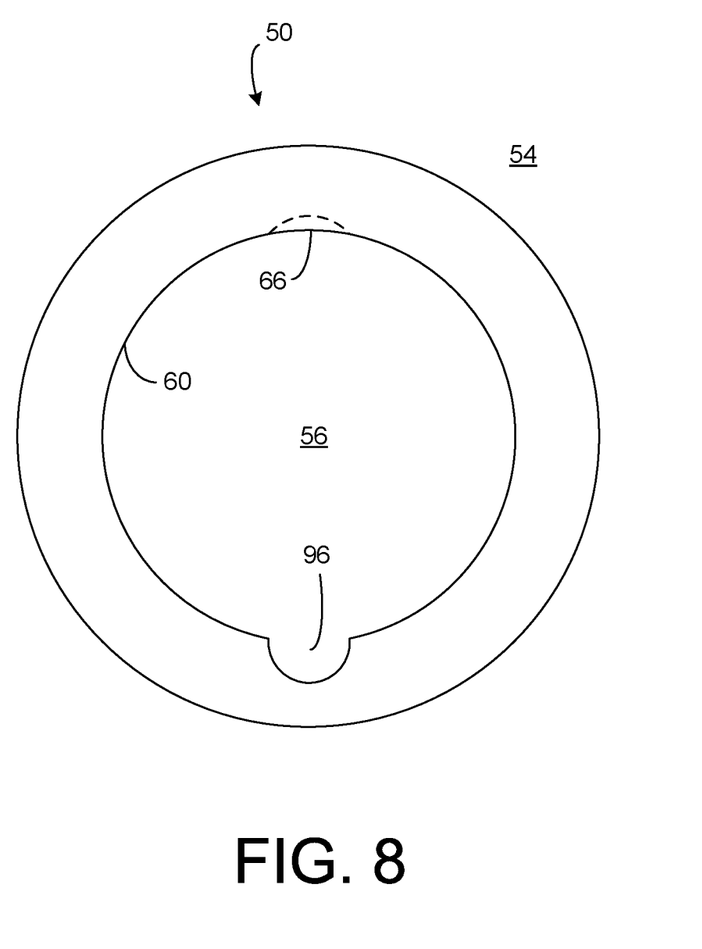
FIG. 8 is a top view of the bore and retaining shoulder of the present invention.

Referring to FIG. 8, there is shown a top view of the retaining shoulder 60 of the fluid end assembly 50. In FIG. 8, it can be seen how the retaining shoulder 60 extends nearly continuously around the bore 56. However, a cutout 96 is provided in the retaining shoulder. The cutout 96 has a width that is approximately equal to or slightly greater than the width of the narrowest of the wings, namely wing 80. Opposite the cutout 96, there is shown the indentation 66, which is formed in the retaining shoulder 60. As shown in FIG. 8, this indentation 66 does not necessarily extend the entire way around the retaining shoulder 60. Rather, the indentation 66 is provided in a particular spot to ensure proper installation of the valve stop 52.

During installation, the valve stop 52 is inserted at an angle, with the arrow 75 and wing 80 pointed in the direction of the cutout 96. The wings 82 and 84 are tilted downwardly and are positioned to engage the retaining shoulder 60. Then, the valve stop 52 is tilted downwardly such that the wing 80 passes over and through the cutout 96. The valve stop 52 is then rotated in a clockwise or counterclockwise direction until the first wing is aligned with the indentation 66. At this time, the side of the valve stop adjacent the first wing 80 can be tilted upwardly such that the tip 106 is positioned within the indentation, or grooved area 66. This securely locks the valve stop 52 in the proper position.

Figure 9A:
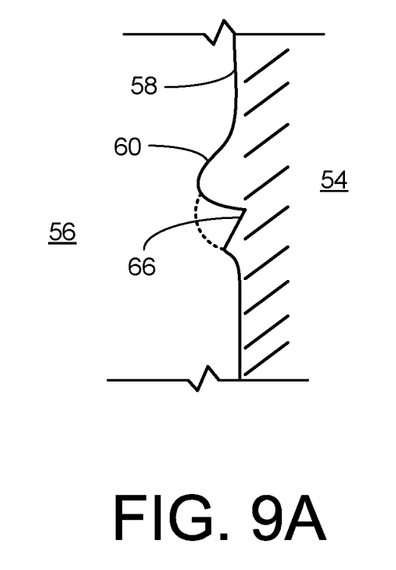
FIGS. 9A and 9B illustrate profiles of the retaining shoulder and the retaining shoulder with indentation, respectively.
Figure 9B:
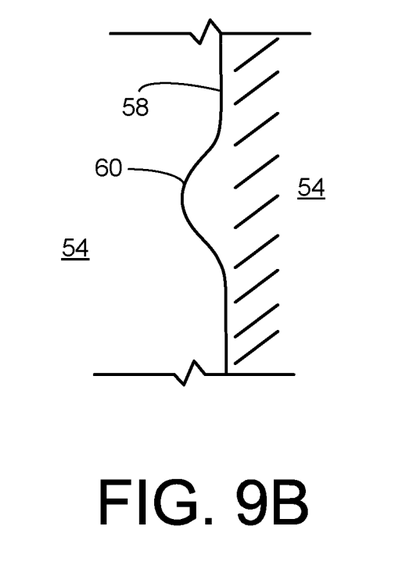

FIGS. 9A and 9B illustrate profile views of the retaining shoulder 60. FIG. 9A illustrates the retaining shoulder. FIG. 9B illustrates the retaining shoulder in the area where the indentation 66 is formed. As can be seen, the profile in FIG. 9B generally matches that of the retaining shoulder 60 shown in FIG. 9A, however, the indentation 66 (in the form of a notched or grooved area) is cut out from the curvature of the retaining shoulder 60. This allows for positioning of the tip 106 of the wing 80.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:
1. A fluid end assembly comprising:
   a body having at least one bore therein, the at least one bore having a wall defining an inner diameter of the bore, the wall having a retaining shoulder extending inwardly therefrom;
   a valve slidably movable in the at least one bore;

a spring having one end abutting a surface of said valve, said spring positioned in the inner diameter of the at least one bore; and a valve stop having a surface bearing against the retaining shoulder, said spring having an opposite end abutting a surface of said valve stop, wherein the retaining shoulder of the at least one bore has an indentation between a first portion and a second portion of the retaining shoulder, wherein said valve stop has an outer periphery having a generally U-shaped channel, the retaining shoulder being received within the generally U-shaped channel of the outer periphery of said valve stop.

2. The fluid end assembly of claim 1, wherein a surface of the U-shaped channel is positioned within the indentation between the first portion and the second portion of the retaining shoulder.

3. The fluid end assembly of claim 1, wherein said valve stop has a central portion with a plurality of wings radiating outwardly of the central portion.

4. The fluid end assembly of claim 3, wherein the plurality of wings of said valve stop comprises three wings being equally circumferentially spaced from each other.

5. The fluid end assembly of claim 4, wherein each of the three wings has an outer periphery, the outer periphery being engaged with retaining shoulder of said at least one bore.

6. The fluid end assembly of claim 5, wherein the retaining shoulder of said at least one bore extends nearly entirely around the inner diameter of the at least one bore.

7. The fluid end assembly of claim 6, wherein a surface of the U-shaped channel is positionable in the indentation between the first portion and the second portion of the retaining shoulder.

8. The fluid end assembly of claim 6, the retaining shoulder having an opening formed therein.

9. The fluid end assembly of claim 8, the opening of the retaining shoulder having a width greater than a width of at least one of the three wings.

10. The fluid end assembly of claim 4, wherein the opposite end of said spring abuts the central portion of said valve stop.

11. A valve stop for use in a bore of a fluid end assembly, the valve stop comprising:

a central portion having a plurality of wings radiating outwardly of said central portion, the plurality of wings being circumferentially spaced from each other; and an outer surface formed at an outer periphery of each of the plurality of wings, the outer surface adapted to receive a retaining shoulder extending inwardly of a wall of the bore of the fluid end assembly, wherein said outer surface has a generally U-shaped channel formed at an outer periphery thereof, the U-shaped portion adapted to receive the retaining shoulder of the bore therein.

12. The valve stop of claim 11, wherein the plurality of wings comprises three wings circumferentially spaced from each other.

13. The valve stop of claim 11, said central portion having a spring-receiving surface thereon, the spring-receiving surface adapted to receive one end of a spring thereon.

14. A fluid end assembly comprising:

a body having at least one bore therein, the at least one bore having a wall defining an inner diameter of the bore, wall having a retaining shoulder extending inwardly therefrom;

a valve slidably mounted within the at least one bore;

a spring having one end abutting a surface of said valve, said spring positioned in the inner diameter of the at least one bore; and a valve stop having a plurality of wings radiating outwardly of a central portion thereof, the plurality of wings being circumferentially spaced from each other, each of the plurality of wings having an outer surface bearing against the retaining shoulder of the at least one bore of said body, wherein the retaining shoulder of the at least one bore has an indentation between a first portion and a second portion of the retaining shoulder, the outer surface of the plurality of wings has a generally U-shaped channel, the retaining shoulder being received within the generally U-shaped channel.

15. The fluid end assembly of claim 14, wherein the plurality of wings is three wings, each of the three wings being equally circumferentially spaced from each other.

16. The fluid end assembly of claim 14, wherein an interior of the generally U-shaped channel receives the first portion of the retaining shoulder therein, wherein a surface of the U-shaped channel is positioned in the indentation between the first portion and the second portion of the retaining shoulder.

* * * * *